US011792348B2

(12) United States Patent
Nagura et al.

(10) Patent No.: US 11,792,348 B2
(45) Date of Patent: Oct. 17, 2023

(54) IMAGE FORMING APPARATUS

(71) Applicant: CANON KABUSHIKI KAISHA, Tokyo (JP)

(72) Inventors: Hideo Nagura, Saitama (JP); Takahiro Nakase, Ibaraki (JP); Yoshinori Hara, Ibaraki (JP); Shintaro Kawai, Ibaraki (JP); Ryo Suzuki, Chiba (JP); Nobuaki Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/960,946

(22) Filed: Oct. 6, 2022

(65) Prior Publication Data
US 2023/0113952 A1 Apr. 13, 2023

(30) Foreign Application Priority Data
Oct. 11, 2021 (JP) .................................. 2021-166637

(51) Int. Cl.
*H04N 1/60* (2006.01)
*H04N 1/405* (2006.01)

(52) U.S. Cl.
CPC ........... *H04N 1/6033* (2013.01); *H04N 1/405* (2013.01)

(58) Field of Classification Search
CPC .............................. H04N 1/6033; H04N 1/405
See application file for complete search history.

(56) References Cited

U.S. PATENT DOCUMENTS 9,001,383 B2* 4/2015 Haruta .................. H04N 1/506
358/1.9
2012/0154834 A1* 6/2012 Miyake ............. H04N 1/00888
358/1.9

FOREIGN PATENT DOCUMENTS

JP 2002-202648 A 7/2002
JP 2006-303636 A 11/2006
JP 2014-215333 A 11/2014

* cited by examiner

*Primary Examiner* — Quang N Vo
(74) *Attorney, Agent, or Firm* — Venable LLP

(57) ABSTRACT

An image forming apparatus includes an image forming unit configured to form an image on a sheet; an image processing unit configured to perform processing, which comprises correction of color misregistration, on image data for controlling the image forming unit to form the image; and a controller configured to instruct the image forming unit to perform calibration in a case where a component of the image forming unit is replaced. The image forming unit includes a storage unit, and is configured to acquire correction information to be used for the correction of color misregistration in the calibration to store the correction information in the storage unit, and the image processing unit includes a memory configured to store first image data, which is the image data before being processed, and second image data, which is obtained by compressing the image data after being processed.

9 Claims, 10 Drawing Sheets

FIG. 1

| REGION | WIDTH [mm] | DEVIATION [mm] |
|---|---|---|
| FIRST REGION | L1 | m1 |
| SECOND REGION | L2-L1 | m2-m1 |
| THIRD REGION | L3-L2 | m3-m2 |

FIG. 4

FIG. 5D CORRECTION AMOUNT

| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β = Δy−k | 0 | 0.25 | 0.5 | 0.75 | 0 | 0.25 | 0.5 | 0.75 | 0 |
| α = t−β | 0 | 0.75 | 0.5 | 0.25 | 0 | 0.75 | 0.5 | 0.25 | 0 |

IMAGE FORMING APPARATUS

BACKGROUND OF THE INVENTION

Field of the Invention

The present disclosure relates to an image forming apparatus, such as a copying machine, a multi-function printer, a printer, a facsimile machine, or a printing apparatus.

Description of the Related Art

An image forming apparatus such as an electrophotographic color copying machine or color printer forms a full-color image by superimposing images of a plurality of color components. In order to perform such image formation, the image forming apparatus includes a plurality of photosensitive members and an intermediate transfer member, for example. Monochromatic images of respective color components are formed on the respective photosensitive members. The images on the photosensitive members are transferred in superimposition onto the intermediate transfer member, and thus a full-color image is formed on the intermediate transfer member. The full-color image on the intermediate transfer member is transferred onto a sheet and fixed thereto. The full-color image is thus formed on the sheet.

In such an image forming apparatus, relative positions of the images of the respective color components transferred onto the intermediate transfer member may be shifted due to the position accuracy or dimensional deviations of the photosensitive members, the position accuracy of an exposure devices that expose the photosensitive members with light, or the like. This shift of relative positions causes "color misregistration" in which the hue of a full-color image does not become a predetermined hue. In Japanese Patent Application Laid-open No. 2002-202648, Japanese Patent Application Laid-open No. 2006-303636, and Japanese Patent Application Laid-open No. 2014-215333, there is proposed calibration including correction of color misregistration. In Japanese Patent Application Laid-open No. 2002-202648, there is disclosed an image forming apparatus including an image processing unit that corrects image data representing an image to be formed in order to correct skew or distortion of the image and an image forming unit that corrects the image data corrected by the image processing unit in order to correct a relative position of each color-component image. In Japanese Patent Application Laid-open No. 2006-303636, there is disclosed a technology of obtaining a favorable image without using a large-capacity memory even in the case in which the image position is shifted. In Japanese Patent Application Laid-open No. 2014-215333, there is disclosed a technology of adjusting an image density. In Japanese Patent Application Laid-open No. 2014-215333, there is also disclosed a method of controlling emission of an exposure device used in forming an image on a photosensitive member. This emission control method converts 8-bit RGB image data to 8-bit CYMK image data, performs tone correction for the converted image data, and performs halftone processing, to thereby generate 1-bit CYMK image data. The exposure device is controlled to emit light based on the generated 1-bit CYMK data.

A photosensitive member may be integrated with a charging device that charges a surface of the photosensitive member, a developing device that develops an electrostatic latent image formed on the photosensitive member, and the like. Such an integrated configuration is referred to as "cartridge" herein. The cartridge can be attached to and detached from an image forming apparatus, and is replaced with a new one when its durable period has expired. The color misregistration may not be eliminated even by the related-art correction described above and may cause formation of an image defect, depending on the content of image data or a timing of cartridge replacement.

FIG. 8 is an explanatory diagram of an image processing unit that processes image data in an image forming apparatus. An image forming apparatus 1 includes an image processing unit 800, a controller 600, an image forming unit 900, and a UI unit 50. The image processing unit 800 includes a PDL/RIP processing unit 801, a color processing unit 802, a tone correction unit 803, a color misregistration-correction-amount calculation unit 804, a halftone processing unit 805, a memory 806, and an additional processing unit 807. The UI unit 50 is a user interface including a display unit 501 and an operation unit 502. The image forming apparatus 1 is connected to a personal computer (PC) 700, which is an example of an external device, via a predetermined network.

The image forming apparatus 1 acquires image data from the PC 700. The image data is expanded by the PDL/RIP processing unit 801 to a raster image of each color. The raster image represents an image as an arrangement or a set of colored dots (points). The raster image is typically 8-bit data.

In a case where the controller 600 has acquired an instruction of calibration, such as correction of color misregistration, from the UI unit 50, the controller 600 controls the image forming unit 900 to acquire the amount of color misregistration of each color. The amount of color misregistration is stored in a color misregistration-amount storage unit 901 provided in the image forming unit 900. In a case where the amount of color misregistration has been already stored, the stored amount of color misregistration is updated to the newly acquired amount of color misregistration. The raster image is expanded by the color misregistration-correction-amount calculation unit 804 to a raster image with the corrected amount of color misregistration.

The processing time for those processes varies depending on image data and a method of calculating the amount of color misregistration. Thus, image data after being expanded to a raster image that has a fixed data size and requires a stable processing time is output while being accumulated in the memory 806. Accordingly, variation in the processing time in the PDL/RIP processing unit 801 is absorbed, and hence productivity is maintained.

In order to reduce the cost of the memory 806, it is desired that the data amount of the image data to be accumulated be smaller. The halftone processing unit 805 typically represents a tone by an area, to thereby reduce the number of bits of data. For example, the halftone processing unit 805 compresses 8-bit image data (raster image) to 1-bit image data. Through accumulation of the image data after this halftone processing in the memory 806, the data amount of the image data accumulated in the memory 806 can be reduced.

The case in which a cartridge in the image forming apparatus 1 is replaced is described. FIG. 9 is an explanatory diagram of an operation performed when a cartridge is replaced during execution of jobs (image data of a plurality of pages). A cartridge A is used at the start of execution of a first job, and is replaced with a cartridge B during execution of the first job. A second job is executed through use of the cartridge B after the first job is finished.

During execution of the first job, image data of the first job is subjected to color misregistration correction based on the amount of color misregistration obtained by calibration using the cartridge A. Color misregistration correction is performed by calculation of an offset amount of one pixel by the color misregistration-correction-amount calculation unit 804 based on the amount of color misregistration acquired from the color misregistration-amount storage unit 901 and correction of the image data using the calculated offset amount. The image data after color misregistration correction is processed by the halftone processing unit 805 and then accumulated in the memory 806. The image data of the first job accumulated in the memory 806 is processed by the additional processing unit 807 and then transmitted to the image forming unit 900. The image forming unit 900 performs image formation on a sheet based on the corrected image data. In the middle of this first job, the cartridge A is replaced with the cartridge B, for example, because of expiration of a durable period.

The cartridge A which has changed with time and the brand-new cartridge B after replacement are different from each other in tone characteristics and the amount of color misregistration. Further, the difference also includes the individual difference. For this reason, calibration using the cartridge B is performed, and the amount of color misregistration in the color misregistration-amount storage unit 901 is updated. Consequently, the amount of color misregistration in image formation using the cartridge B is corrected for image data of the second job to be executed next.

However, an image by the first job output after replacement of the cartridge A with the cartridge B is obtained by outputting an image for which color misregistration has been corrected in accordance with the cartridge A, by using the cartridge B. Thus, color misregistration is not corrected properly, and hence an image defect is formed. In FIG. 9, the first job executed in a period A is executed by using the cartridge B, and hence color misregistration remains uncorrected in the formed image.

FIG. 10 is an explanatory diagram of an image processing unit that processes image data. This image processing unit is configured to be able to perform accurate color misregistration correction even when cartridge replacement is performed in the middle of a job. In this image processing unit 800, image data (raster image) processed by the PDL/RIP processing unit 801 is stored in the memory 806. This configuration enables color misregistration correction with the updated amount of color misregistration to be performed from formation of an image of the next page, even when cartridge replacement is performed. However, the stored image data is data before being compressed by the halftone processing unit 805, and hence the data amount of image data stored in the memory 806 becomes large. Thus, the cost of the memory 806 increases. The present disclosure has been made in view of the problems described above, and a main object thereof is to provide an image forming apparatus capable of performing accurate color misregistration correction at low cost even when a cartridge is replaced in the middle of a job.

SUMMARY OF THE INVENTION

An image forming apparatus according to the present disclosure includes: an image forming unit configured to form an image on a sheet; an image processing unit configured to perform processing, which comprises correction of color misregistration, on image data for controlling the image forming unit to form the image; and a controller configured to instruct the image forming unit to perform calibration in a case where a component of the image forming unit is replaced, wherein the image forming unit includes a storage unit, and is configured to acquire correction information to be used for the correction of color misregistration in the calibration to store the correction information in the storage unit, wherein the image processing unit includes a memory configured to store first image data, which is the image data before being processed, and second image data, which is obtained by compressing the image data after being processed, wherein, in a case where calibration is unexecuted, the controller is configured to control the image forming unit to form an image based on the second image data stored in the memory, and wherein, in a case where the calibration has been executed, the controller is configured to control the image forming unit to update the correction information stored in the storage unit, control the image processing unit to process the first image data based on the updated correction information, and control the image forming unit to perform image formation based on the processed first image data.

Further features of the present invention will become apparent from the following description of exemplary embodiments (with reference to the attached drawings).

BRIEF DESCRIPTION OF THE DRAWINGS

FIG. 1 is a configuration diagram of an image forming apparatus.

FIG. 4 is an explanatory diagram of information stored in a color misregistration-amount storage unit.

FIG. 5A, FIG. 5B, FIG. 5C, FIG. 5D, FIG. 5E, and FIG. 5F are explanatory diagrams of color misregistration correction.

DESCRIPTION OF THE EMBODIMENTS

Figure 2:
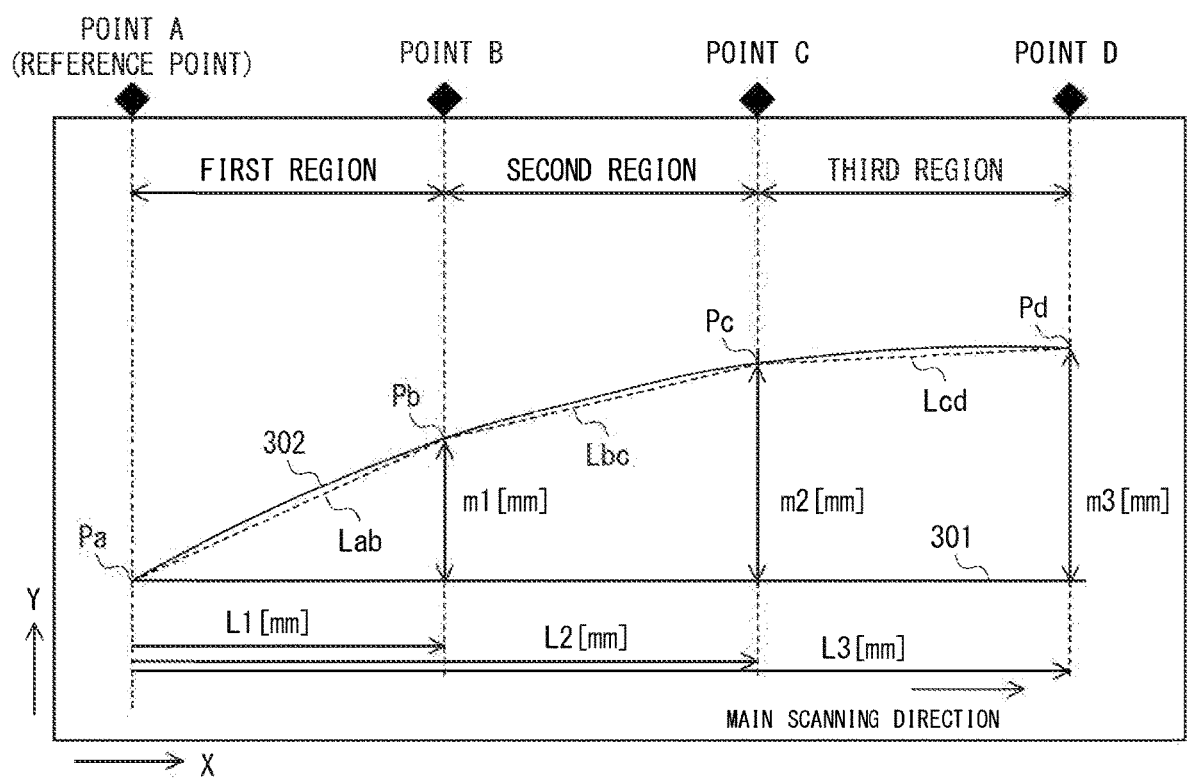
FIG. 2 is an explanatory diagram of deviation of a main scanning line.

A preferred embodiment of the present disclosure is illustratively described in detail below with reference to the drawings. Relative placement of components, numerical values, and the like described in this embodiment are not intended to limit the scope of the present disclosure only thereto unless otherwise specified.

<Image Forming Apparatus>

Figure 1:
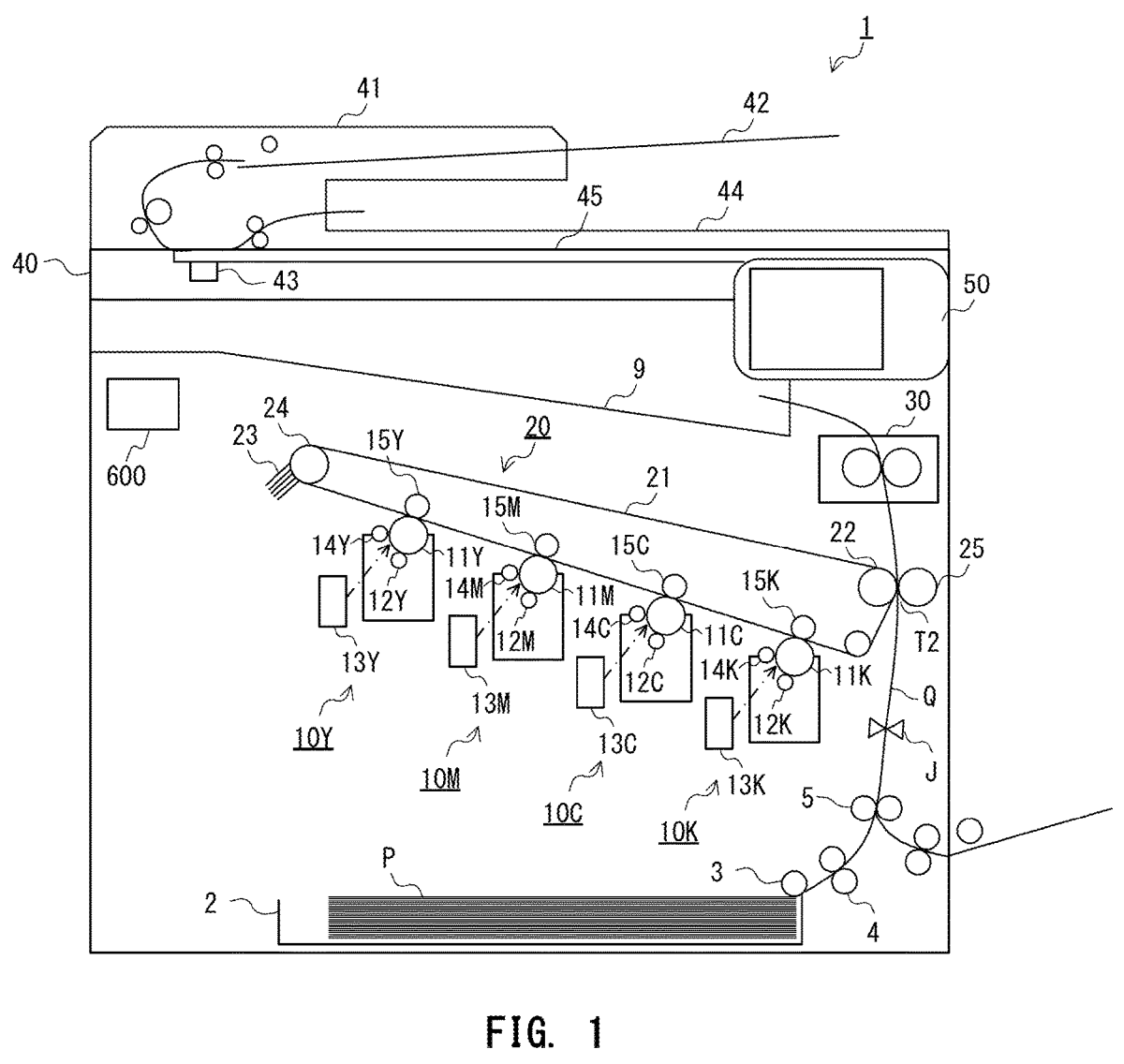

FIG. 1 is a configuration diagram of an image forming apparatus according to this embodiment. An image forming apparatus 1 forms images by electrophotographic image forming units 10Y, 10M, 10C, and 10K, transfers the images onto a sheet P by a transfer portion (secondary transfer roller 25), and fixes the images to the sheet P by a fixing unit 30. The sheet P is a recording medium having a surface on which an image is printed. Examples of the sheet P include plain paper, cardboard, an OHP sheet, coated paper, label paper, and perforated paper. The image forming apparatus 1 according to this embodiment is, for example, a four-color full-color multi-function printer.

The image forming apparatus 1 includes a controller 600 that controls an operation of each component included in the image forming apparatus 1. The controller 600 controls the components included in the image forming apparatus 1 in an integrated manner based on a print information signal including image data and sheet information input from an external device, to perform an image forming operation.

The image forming apparatus 1 forms a multicolor image by superimposing toner images generated through use of developers (hereinafter referred to as "toners") of four colors including yellow (Y), magenta (M), cyan (C), and black (K). To perform this image formation, the image forming apparatus 1 includes the image forming units 10Y, 10M, 10C, and 10K that form toner images of the respective colors. Although reference symbols in the drawings have suffixes Y, M, C, and K, the image forming units 10Y, 10M, 10C, and 10K for the respective colors have the same basic configuration. Thus, suffixes are omitted herein when it is not required to distinguish colors from each other in the description.

The image forming unit 10 includes an electrophotographic photosensitive member having the form of a rotating drum (hereinafter referred to as "photosensitive drum") 11 as an image bearing member on which an image is formed. The image forming unit 10 further includes a cleaning member (not shown), a charging roller 12 serving as a charging device, and a developing device 14, which are process units acting on the photosensitive drum 11. A toner container of the developing device 14 accommodates toner of a corresponding color which is basically negatively charged. A laser scanner unit 13 serving as an exposure device for the photosensitive drum 11 is arranged near the image forming unit 10. A sheet-feeding cassette 2 accommodating sheets P is arranged below the image forming unit 10. A transfer belt unit (hereinafter referred to as "transfer unit") 20 is provided above the image forming unit 10.

The photosensitive drum 11 has a photosensitive layer on its surface and rotates about a drum shaft. The charging roller 12 uniformly charges the surface of the photosensitive drum 11 that is rotating. The laser scanner unit 13 exposes the charged surface of the photosensitive drum 11 with laser light emitted from the laser scanner unit 13 based on image data of a corresponding color. Through exposure with laser light, an electrostatic latent image in accordance with the image data is formed on the surface of the photosensitive drum 11. The developing device 14 causes toner of a corresponding color to adhere to the electrostatic latent image, to thereby form a toner image of the corresponding color on the surface of the photosensitive drum 11.

The laser scanner unit 13 includes, for example, a light source of the laser light and an optical component including a rotary polygon mirror. The light source emits the laser light that flashes on and off in accordance with the image data. The optical component deflects the emitted laser light toward the photosensitive drum 11. In this deflection, the rotary polygon mirror reflects the laser light while rotating. The direction in which the optical component deflects the laser light is moved through rotation of the rotary polygon mirror. The photosensitive drum 11 is thus scanned with the laser light in one direction. In this embodiment, the surface of the photosensitive drum 11 is scanned with the laser light in a direction along the drum shaft. Thus, the direction along the drum shaft of the photosensitive drum 11 is a main scanning direction.

The transfer unit 20 includes an intermediate transfer belt 21, a drive roller 22 that drives the intermediate transfer belt 21, and a tension roller 24. Four primary transfer rollers 15 are arranged inside the intermediate transfer belt 21. Each primary transfer roller 15 is arranged to be opposed to the photosensitive drum 11 of a corresponding image forming unit 10 with the intermediate transfer belt 21 sandwiched therebetween. The photosensitive drum 11 and the primary transfer roller 15 form a primary transfer portion. Toner images borne by the respective photosensitive drums 11 are transferred in superimposition onto the intermediate transfer belt 21 by the primary transfer portions. The intermediate transfer belt 21 functions as the image bearing member. A full-color toner image is thus formed on the intermediate transfer belt 21.

The drive roller 22 drives the intermediate transfer belt 21 to rotate. The secondary transfer roller 25 that is a transfer portion is arranged at a position opposed to the drive roller 22 with the intermediate transfer belt 21 sandwiched therebetween. The intermediate transfer belt 21 and the secondary transfer roller 25 are in contact with each other, and form a secondary transfer nip portion T2 by this contact portion. The intermediate transfer belt 21 rotates to convey the full-color toner image borne thereon to the secondary transfer nip portion T2. The secondary transfer roller 25 transfers the toner image borne by the intermediate transfer belt 21 onto the sheet P fed from the sheet-feeding cassette 2 in the secondary transfer nip portion T2.

The tension roller 24 applies a predetermined tension to the intermediate transfer belt 21. An intermediate transfer belt cleaner 23 is arranged at a position opposed to the tension roller 24 with the intermediate transfer belt 21 sandwiched therebetween. The intermediate transfer belt cleaner 23 includes a brush-like elastic body. The elastic body of the intermediate transfer belt cleaner 23 is pressed against the intermediate transfer belt 21, and thus toner that has not been transferred onto the sheet P in the secondary transfer nip portion T2 and remains on the intermediate transfer belt 21 is applied with a cleaning voltage having a positive polarity from a power supply unit (not shown). Accordingly, the toner that remains on the intermediate transfer belt 21 has a positive polarity that is opposite to the usual polarity. In the primary transfer portion to which a positive voltage is applied, toner that is charged to the usual negative polarity is transferred from the photosensitive drum 11 onto the intermediate transfer belt 21, whereas the toner that remains on the intermediate transfer belt 21 and is charged to the positive polarity is collected to the photosensitive drum 11 side. The toner collected to the photosensitive drum 11 side is collected by a drum cleaning member.

The image forming apparatus 1 includes a conveyance path Q for feeding the sheet P from the sheet-feeding cassette 2. On the conveyance path Q, there are arranged a feed roller 3, a separation roller pair 4, a registration roller pair 5, a paper jam detection mechanism J, the secondary transfer roller 25, the fixing unit 30, and a delivery roller pair (not shown) in the stated order from the upstream side in the conveyance direction of the sheet P. The sheet P is conveyed to a delivery tray 9 via the conveyance path Q.

The feed roller 3 picks up the sheet P from the sheet-feeding cassette 2 and feeds the sheet P to the conveyance path Q. The sheet P fed by the feed roller 3 is separated one by one by the separation roller pair 4 by a known separation technology. The sheet P is thus conveyed to the conveyance path Q one by one by the feed roller 3 and the separation roller pair 4. The sheet P conveyed on the conveyance path Q is subjected to skew correction by the registration roller pair 5, and is then conveyed to the secondary transfer nip portion T2 in synchronization with a timing at which a toner image borne by the intermediate transfer belt 21 is conveyed to the secondary transfer nip portion T2. The paper jam detection mechanism J detects whether or not the sheet P to be conveyed to the secondary transfer nip portion T2 is jammed. The sheet P with the toner image transferred thereto in the secondary transfer nip portion T2 is conveyed to the fixing unit 30 by the secondary transfer roller 25.

The fixing unit 30 includes a pair of rollers that presses the sheet P and a heater that heats the sheet P. The fixing unit 30 heats the sheet P while pressing the sheet P, to thereby fuse and fix the unfixed toner image on the sheet P to the sheet P. The fixing unit 30 applies a predetermined voltage to the surfaces of the pair of rollers to suppress electrical adhesion of toner to the rollers. The sheet P having the image fixed thereto by the fixing unit 30 is delivered to the delivery tray 9.

The image forming apparatus 1 includes an image reader 40 mounted in its upper portion. The image reader 40 has a function of reading an image of an original with an optical sensor 43 and converting the read image to image data. The image reader 40 includes an auto document feeder (ADF) 41 including an original tray 42, and an original table glass 45 on which an original is to be placed. In the case of reading an image from an original by using the ADF 41, the original is placed on the original tray 42, passes through a reading position at which reading is performed by the optical sensor 43 one by one, and is then delivered to a delivery tray 44. In this case, the optical sensor 43 reads the image from the original passing through the reading position, without moving. In the case of reading an image from an original by using the original table glass 45, the original is placed with its image forming surface facing the original table glass 45, and the image is read by the optical sensor 43. In this case, the optical sensor 43 reads the image from the original placed on the original table glass 45, while moving.

The image forming apparatus 1 includes a UI unit 50 for displaying the status of the image forming apparatus 1 and receiving input of a user's instruction or the like. The UI unit 50 thus includes a display unit and an operation unit, which are described later.

<Color Misregistration>

As described above, the photosensitive drum 11 is scanned with laser light emitted from the laser scanner unit 13. The direction of scanning on the photosensitive drum 11 with the laser light is referred to as "main scanning direction." The trajectory of scanning on the photosensitive drum 11 with the laser light is referred to as "main scanning line."

FIG. 2 is an explanatory diagram of deviation of the main scanning line on the photosensitive drum 11. The X-direction is the main scanning direction, and the Y-direction is a rotation direction of the photosensitive drum 11. The rotation direction of the photosensitive drum 11 is a sub-scanning direction orthogonal to the main scanning direction. In a case where ideal scanning is performed, a main scanning line 301 is formed. However, due to various factors, it is a main scanning line 302 that is formed by the scanning. Sloping and curving of the main scanning line 302 toward the upper right side occurs, for example, due to the position accuracy or deviation of the diameter of the photosensitive drum 11 and deviation of the position accuracy of the optical component in the laser scanner unit 13.

In the case in which such sloping and curving of the main scanning line 302 is present in the photosensitive drum 11 of any one of the image forming units 10, color misregistration (position shift, or registration shift) occurs in toner images of respective colors transferred onto the intermediate transfer belt 21.

In this embodiment, in the main scanning direction (X-direction), the amount of deviation in the sub-scanning direction (Y-direction) between the main scanning line 301 and the main scanning line 302 is measured at a plurality of points (points B, C, and D) by using the point A, which is a scanning start position of a printing region, as a reference point. The printing region is divided into a plurality of regions at the points at which the amount of deviation is measured, that is, into a region between the points A and B as a first region, a region between the points B and C as a second region, and a region between the points C and D as a third region. The slope of the main scanning line 302 in each region is approximated by lines connecting a measurement point Pa on the main scanning line 302 at the point A, a measurement point Pb on the main scanning line 302 at the point B, a measurement point Pc on the main scanning line 302 at the point C, and a measurement point Pd on the main scanning line 302 at the point D. That is, the slope of the main scanning line 302 in the first region is approximated by a line Lab. The slope of the main scanning line 302 in the second region is approximated by a line Lbc. The slope of the main scanning line 302 in the third region is approximated by a line Lcd.

In the example of FIG. 2, the amounts of deviation are measured at the respective measurement points Pb, Pc, and Pd, and values thereof are m1, m2, and m3, respectively. In a case where a difference between the amounts of deviation at the points (m1 for the first region, m2−m1 for the second region, and m3−m2 for the third region) is a positive value, the main scanning line 302 in that region has the sloping toward the upper right side in the X-Y plane exemplified in FIG. 2. In a case where the difference between the amounts of deviation at the points is a negative value, the main scanning line 302 in that region has the sloping toward the lower right side.

<Controller>

Figure 3:
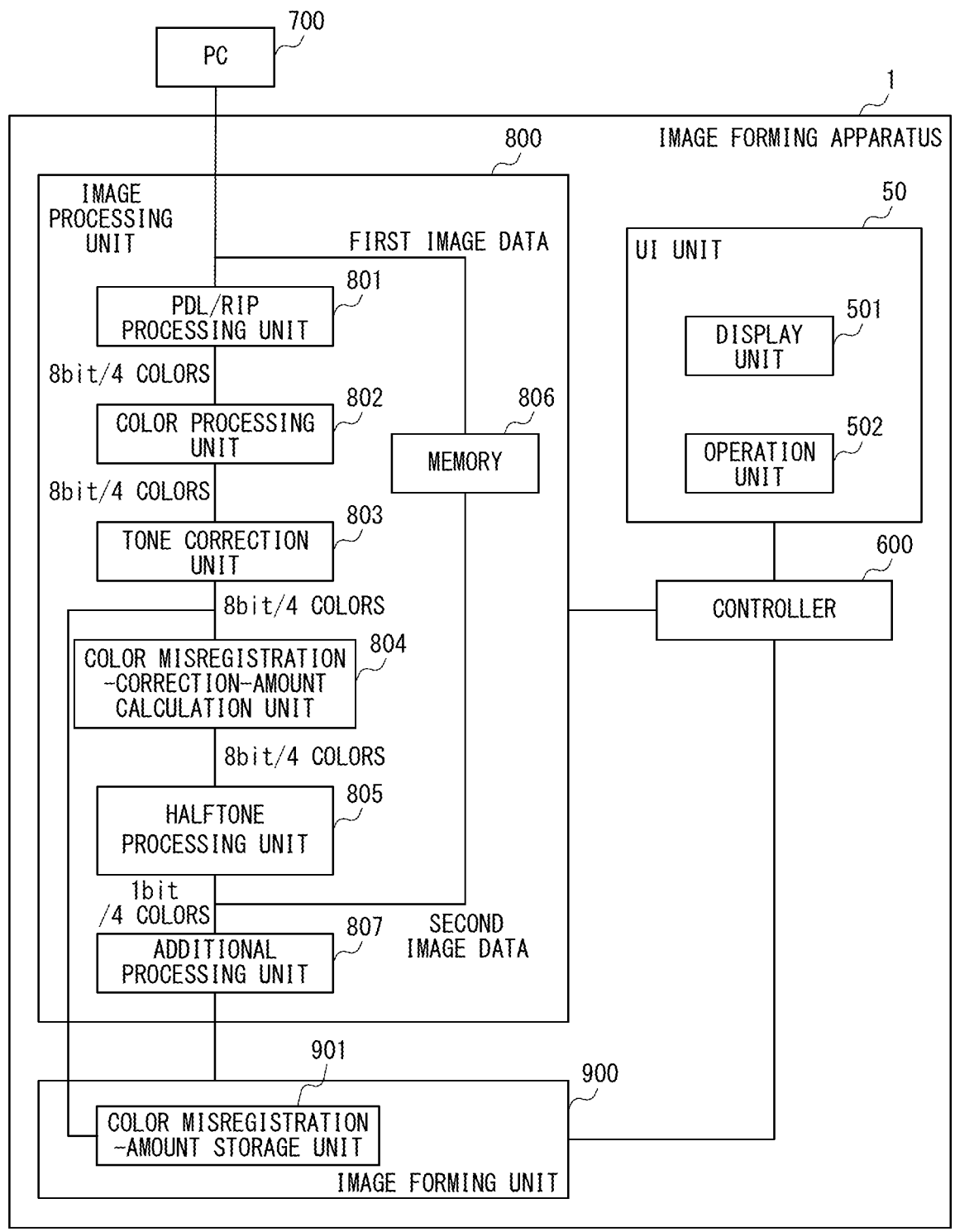
FIG. 3 is an explanatory diagram of a controller of an image forming apparatus.

FIG. 3 is an explanatory diagram of a controller of the image forming apparatus 1.

The controller 600 is a device including a calculation unit, such as a central processing unit (CPU), and a storage (memory), such as a read only memory (ROM) and a random access memory (RAM), which are not shown. The controller 600 controls an operation of the image forming apparatus 1 with the CPU executing a computer program stored in the memory.

The controller 600 is electrically connected to components including an image processing unit 800, an image forming unit 900, and the UI unit 50. The controller 600 performs communication to/from the image processing unit 800, the image forming unit 900, and the UI unit 50. The image processing unit 800 and the image forming unit 900 are also incorporated in the image forming apparatus 1. The image processing unit 800 acquires image data from an external device such as the PC 700 or an input device such as the image reader 40, performs image processing including correction of color misregistration, and transmits the processed image data to the image forming unit 900.

The controller 600 controls the components included in the image forming apparatus 1 in an integrated manner based on a print information signal including image data and sheet information acquired from the PC 700 or the like that is the external device communicable to/from the image forming apparatus 1, to perform an image forming operation. The UI unit 50 includes a display unit 501 and an operation unit 502. The operation unit 502 includes various key buttons, a touch panel, and the like. An instruction or the like input from the operation unit 502 is transmitted to the controller 600. The display unit 501 is controlled by the controller 600 to display various types of information.

The image forming unit 900 includes components to be used for image formation, for example, the photosensitive drum 11, the charging roller 12, the laser scanner unit 13, the developing device 14, the primary transfer roller 15, and the fixing unit 30. The image forming unit 900 forms an image on a sheet P based on image data acquired from the image processing unit 800. The controller 600 performs calibration in the case in which at least one of those components of the image forming unit 900 is replaced or in accordance with environmental change or change with time.

The image forming unit 900 includes a color misregistration-amount storage unit 901. The color misregistration-amount storage unit 901 stores the amount of color misregistration of each color. For example, the color misregistration-amount storage unit 901 stores information relating to color misregistration of a main scanning line of each color for each of the above-mentioned regions. In this embodiment, information indicating the slope and curvature of the main scanning line described with reference to FIG. 2 is stored in the color misregistration-amount storage unit 901 for each color. The information indicating the slope and curvature of the main scanning line is a difference between the actual main scanning line 302 and the ideal main scanning line 301, that is, the width in the main scanning direction and the amount of deviation in the sub-scanning direction in each of the regions divided at the points at which the amount of deviation has been measured. The amount of color misregistration of each color stored in the color misregistration-amount storage unit 901 serves as correction information for correcting color misregistration.

FIG. 4 is an explanatory diagram of information stored in the color misregistration-amount storage unit 901. The first to third regions of FIG. 4 correspond to the first to third regions of FIG. 2, respectively. For example, the widths of the first to third regions in FIG. 4 correspond to the widths in the main scanning direction of the first to third regions in FIG. 2, that is, a difference of the x-coordinate between the points Pa and Pb, a difference of the x-coordinate between the points Pb and Pc, and a difference of the x-coordinate between the points Pc and Pd, respectively. The amounts of deviation of the first to third regions in FIG. 4 correspond to the amounts of deviation of the first to third regions in FIG. 2, that is, a difference (m1) of the y-coordinate between the points Pa and Pb, a difference (m2−m1) of the y-coordinate between the points Pb and Pc, and a difference (m3−m2) of the y-coordinate between the points Pc and Pd, respectively.

Although the color misregistration-amount storage unit 901 stores the amount of deviation between the ideal main scanning line 301 and the actual main scanning line 302 as information relating to color misregistration in this embodiment, the information relating to color misregistration is not limited thereto as long as the information enables the slope and curvature characteristics of the actual main scanning line 302 to be derived therefrom. For example, the information relating to color misregistration may be the slope of the actual main scanning line 302 or the coordinates of end points thereof. Further, as the information stored in the color misregistration-amount storage unit 901, the above-mentioned amount of deviation may be measured in a manufacturing process of this apparatus and stored in advance as information specific to the image forming apparatus 1. Further, a detection mechanism for detecting the above-mentioned amount of deviation may be prepared in the image forming apparatus 1 itself so as to employ a configuration of forming a predetermined pattern for measurement of the amount of color misregistration on each photosensitive drum 11 and storing the amount of deviation detected from the pattern by the above-mentioned detection mechanism.

<Image Processing Unit>

The image processing unit 800 includes a PDL/RIP processing unit 801, a color processing unit 802, a tone correction unit 803, a color misregistration-correction-amount calculation unit 804, a halftone processing unit 805, a memory 806, and an additional processing unit 807. The image processing unit 800 acquires data, such as image data, from the PC 700. The image data is transmitted to the PDL/RIP processing unit 801 and the memory 806. The memory 806 accumulates the image data.

The PDL/RIP processing unit 801 performs page description language (PDL) processing and raster image processor (RIP) processing on the acquired data. The PDL processing is processing of analyzing various types of PDL data which have been acquired. The PDL data is described by printer control codes for creating an image per page. The target of the PDL processing is input formats including simple character codes, drawing codes, and photo image codes, and the like, and an input format input without using a driver for a document display file format, that is, PDF. The RIP processing is processing of converting (expanding) PDL data to a bitmap (raster image).

The color processing unit 802 can acquire image data of various types, for example, gray scale data, RGB data, and CMYK data. The color processing unit 802 performs color matching processing on the acquired image data (raster image). Color adjustment using an ICC profile is performed in the color processing unit 802. The ICC profile includes a source profile and a printer profile.

The source profile is used at the time of first converting RGB (or CMYK) data to a standardized L*a*b* space and then converting again the L*a*b* data to a CMYK space suitable for a printer as a target. The source profile includes an RGB profile and a CMYK profile. The RGB profile is selected in a case where the acquired image data is RGB image data, and the CMYK profile is selected in a case where the acquired image data is CMYK image data. The printer profile is created in accordance with the color characteristics of the image forming apparatus 1.

The ICC profile is typically prepared in the form of a lookup table. In a case where RGB (or CMYK) data is input, the source profile uniquely converts the input data to L*a*b* data. The printer profile converts the L*a*b* data to CMYK data that matches the image forming apparatus 1.

The tone correction unit 803 performs tone correction on an output image corresponding to the image forming unit 900. The tone correction unit 803 has a function of maintaining the linearity of the output image which is different depending on the image forming unit 900, by using a one-dimensional lookup table corresponding to each of cyan (C), magenta (M), yellow (Y), and black (K). The result of calibration of image density is typically reflected in this lookup table.

The color misregistration-correction-amount calculation unit 804 corrects image data based on information of the amount of deviation of a main scanning line of each color stored in the color misregistration-amount storage unit 901, so as to cancel out the amount of deviation in the main scanning direction of each region. For example, the color misregistration-correction-amount calculation unit 804 calculates the amount of color misregistration correction in the sub-scanning direction by performing the following calculation for each color. Assuming that coordinate data in the main scanning direction is x mm and the amount of color misregistration correction in the sub-scanning direction is Δy mm, expressions for calculation with regard to the respective regions based on FIG. 2 and FIG. 4 are as follows.

First region: Δy1=x*(m2/L1)
Second region: Δy2=x*(m2−m1)/(L2−L1)
Third region: Δy3=x*(m3−m2)/(L3−L2) Although this calculation has been described in millimeters, the measurement accuracy of the amount of color misregistration and the accuracy of the amount of color misregistration correction can be increased by increasing the resolution.

As shown in FIG. 2, L1, L2, and L3 are distances (unit: mm) in the main scanning direction from the print start position (point A) to the respective points B, C, and D, and m1, m2, and m3 are the amounts of deviation in the sub-scanning direction between the ideal main scanning line 301 and the actual main scanning line 302 in the first region (at the point B), in the second region (at the point C), and in the third region (at the point D).

The halftone processing unit 805 can apply any of different types of screening in an alternative manner depending on a copy function, a printer function, or the like. In general, error diffusion type processing in which moire is less liable to occur is used in a copy operation or the like. In a print operation, screen type processing which uses a dither matrix or the like is used, in consideration of reproducibility of characters and thin lines.

The error diffusion type processing is processing of weighing a target pixel and its surrounding pixels with an error filter, and distributing multi-level errors while maintaining the number of tones to perform correction. The screen type processing is processing of setting a threshold value of a dither matrix to multiple values to express halftones in a pseudo manner. In the screen type processing, image data for each of cyan (C), magenta (M), yellow (Y), and black (K) may be converted independently, and the halftones may be reproduced by switching low screen ruling and high screen ruling depending on the image data.

Further, the halftone processing unit 805 adjusts an output timing for each dot and the light exposure amount for each pixel based on the amount of color misregistration correction calculated for each dot. Accordingly, color misregistration when toner images of respective colors are transferred is prevented. The halftone processing unit 805 reduces the number of bits of data by expressing a tone by an area. For example, the halftone processing unit 805 compresses 8-bit image data (raster image) to 1-bit image data. The halftone processing unit 805 accumulates the image data after the halftone processing in the memory 806. As a result, the data amount of the image data accumulated in the memory 806 can be reduced.

The additional processing unit 807 detects an edge portion in image data of each of cyan (C), magenta (M), yellow (Y), and black (K) by pattern matching. The additional processing unit 807 performs smoothing processing for reducing jaggies by converting the detected edge portion to a pattern reproduced more smoothly. The additional processing unit 807 also performs correction processing or the like in accordance with the image forming unit 900.

<Correction of Color Misregistration>

Figure 5A:
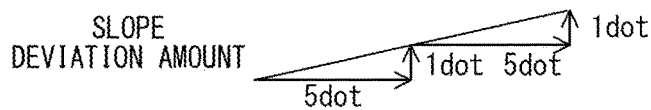
Figure 5B:
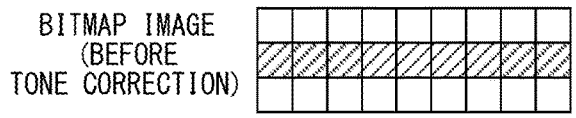
Figure 5C:
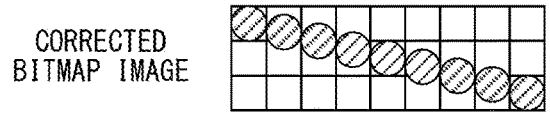

FIG. 5A to FIG. 5F are explanatory diagrams of correction of color misregistration. FIG. 5A exemplifies a main scanning line that slopes toward the upper right side. FIG. 5B shows a bitmap image of a horizontal straight line before correction, that is, of an original image. FIG. 5C shows a corrected bitmap image after the bitmap image exemplified in FIG. 5B has been corrected in order to cancel out color misregistration due to the slope of the main scanning line of FIG. 5A. The corrected bitmap image of FIG. 5C is an ideal one in the case in which the slope deviation amount is given as shown in FIG. 5A, for example.

FIG. 5D is a table for showing a relation between the amount of color misregistration correction Δy and correction coefficients for performing correction. In this table, "k" is an integer part (rounded down after decimal point) of the amount of color misregistration correction Δy and represents the amount of correction per pixel in the sub-scanning direction. Further, β and α are correction coefficients for performing correction of a fraction less than a pixel in the sub-scanning direction, and represent distribution factors of the light exposure amount of dots adjacent in the sub-scanning direction from information after decimal point of the amount of color misregistration correction Δy. The correction coefficients α and β are defined as α=Δy−k and β=1−α, where α represents a distribution factor for a dot that is being scanned, and β represents a distribution factor for a dot in the subsequent line.

Figure 5E:
Figure 5F:
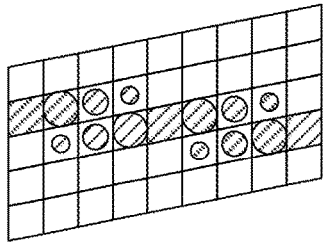

FIG. 5E schematically shows a corrected bitmap image for adjusting a light-exposure ratio for dots adjacent in the sub-scanning direction based on the correction coefficients α and β of FIG. 5D. FIG. 5F shows a light exposure image of the corrected bitmap image on the photosensitive drum 11. FIG. 5F shows that the slope of the main scanning line is canceled out by the corrected bitmap image and a horizontal straight line is formed.

<Processing of Color misregistration Correction>

Processing of suppressing change of color misregistration is described. The image processing unit 800 is configured to be able to not only store image data after being processed by the halftone processing unit 805 in the memory 806 but also store image data before being processed by the tone correction unit 803 in the memory 806. In more detail, image data before being processed by the PDL/RIP processing unit 801 is stored as first image data, and the image data after being processed by the halftone processing unit 805 is stored as second image data (see FIG. 3). In a case where calibration is instructed from the controller 600, the image forming unit 900 calculates the amount of color misregistration of each color and updates the amount of color misregistration of each color in the color misregistration-amount storage unit 901. Through updating of the amount of color misregistration, change of the amount of color misregistration due to component replacement, environmental change, change with time, and the like is suppressed.

Figure 6:
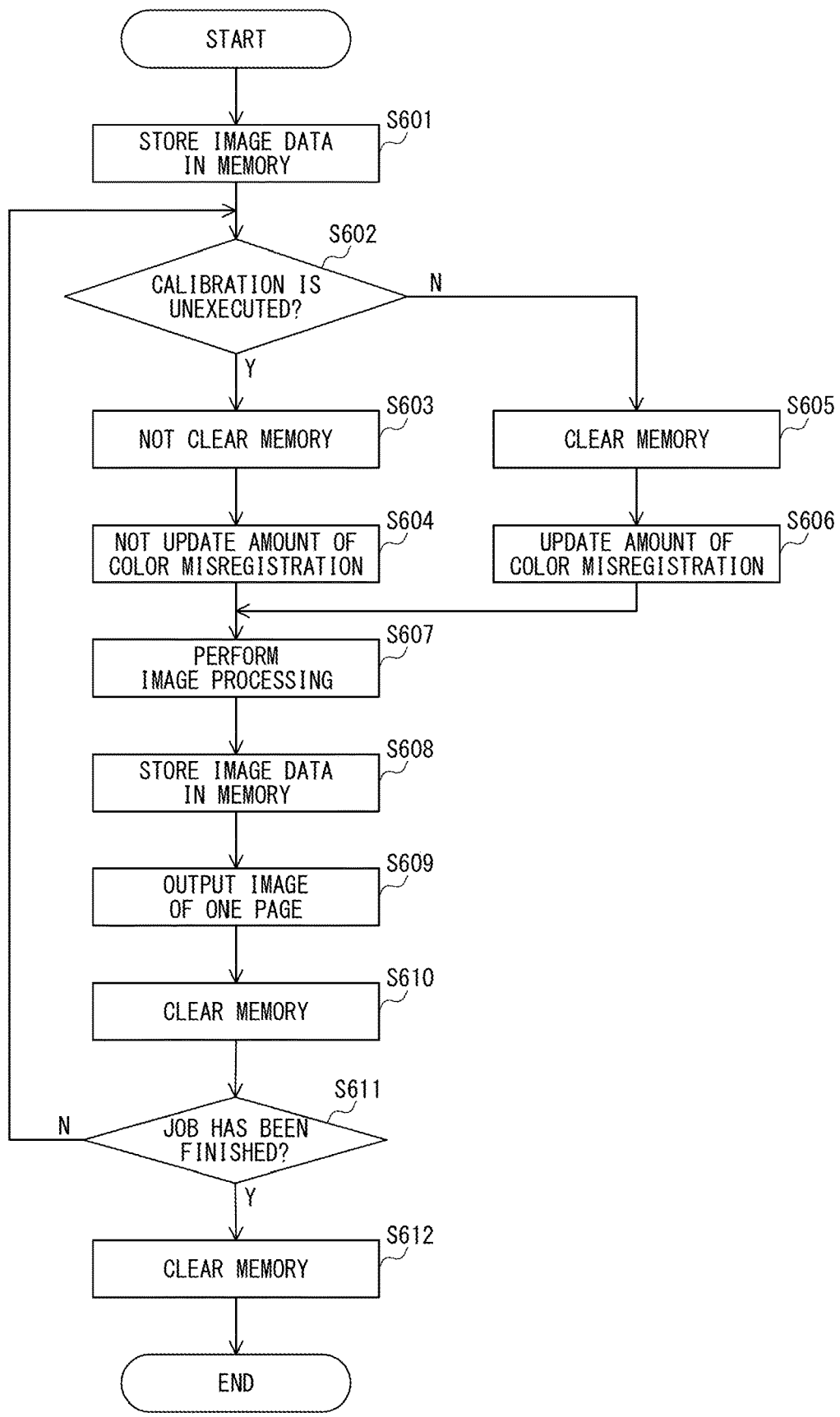
FIG. 6 is a flowchart for illustrating processing of correcting an amount of color misregistration.

FIG. 6 is a flowchart for illustrating processing of correcting the amount of color misregistration.

The controller 600 causes the image processing unit 800 to store image data included in a job input from the PC 700 in the memory 806 as the first image data before being processed by RIP processing (Step S601). The controller 600 examines whether calibration is unexecuted in the case in which at least one of components of the image forming unit 900 is replaced, or in response to environmental change or change with time (Step S602). The components of the image forming unit 900 are, for example, the photosensitive drum 11, the charging roller 12, the laser scanner unit 13, the developing device 14, the primary transfer roller 15, and the fixing unit 30.

The case in which calibration is unexecuted is described (Step S602: Y). In this case, the controller 600 does not clear the second image data after halftone processing (data that has not been output) stored in the memory 806 (Step S603). Further, the controller 600 does not update the amount of color misregistration of each color stored in the color misregistration-amount storage unit 901 (Step S604) because the image forming unit 900 has not calculated the new amount of color misregistration of each color.

The controller 600 performs image processing on the first image data before RIP processing by the PDL/RIP processing unit 801, the color processing unit 802, the tone correction unit 803, the color misregistration-correction-amount calculation unit 804, and the halftone processing unit 805 (Step S607). The first image data turns into the second image data through the processing by the halftone processing unit 805. The controller 600 stores the second image data in the memory 806 (Step S608). The controller 600 sequentially transmits the second image data stored in the memory 806 to the image forming unit 900 to perform image formation (Step S609). The controller 600 clears the second image data from the memory 806 at the time of completion of output of an image corresponding to that second image data (Step S610).

In a case where printing of an image instructed by the job has not been finished and there is an image of a next page (Step S611: N), the controller 600 repeatedly performs the processing steps of Step S602 and the subsequent steps on image data of the next page. In a case where printing of the image instructed by the job has been finished (Step S611: Y), the controller 600 clears the first image data stored in the memory 806 (Step S612) and ends the processing.

For ease of understanding, the case has been described here in which printing of an image of the next page is started after completion of printing of an image of each page. However, in order to maintain the productivity, the processing from the RIP processing to the halftone processing and the processing of storing the second image data in the memory 806 are actually performed in parallel without waiting for completion of printing of an image of a previous page, as long as the storage capacity of the memory 806 allows.

The case in which calibration has been performed is described (Step S602: N). In this case, the controller 600 clears the second image data stored in the memory 806 (Step S605). Further, the controller 600 updates the amount of color misregistration of each color stored in the color misregistration-amount storage unit 901 (Step S606) because the image forming unit 900 has calculated the new amount of color misregistration of each color. The color misregistration-amount storage unit 901 stores therein information relating to color misregistration of a main scanning line for each of the above-mentioned regions. After that, the controller 600 performs the processing steps of Step S607 and the subsequent steps in the same manner as that in the case in which no calibration has been performed. Correction of color misregistration in this case is performed by using the updated amount of color misregistration.

Calibration is performed by the image forming unit 900, for example, when an image of a predetermined page is output in the middle of the job input from the PC 700. For example, at least one of the photosensitive drum 11, the charging roller 12, or the developing device 14 can be attached to and detached from the image forming apparatus 1 as a replaceable cartridge. The image forming apparatus 1 is configured to stop the job when the durable period of any component included in the cartridge expires.

Figure 9:
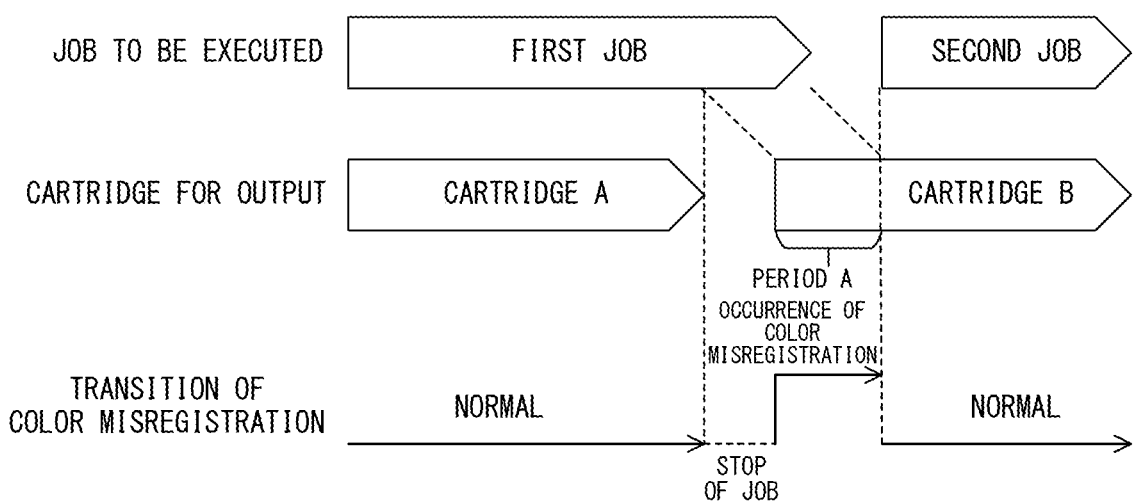
FIG. 9 is an explanatory diagram of an operation performed when a cartridge is replaced during job execution.
Figure 10:
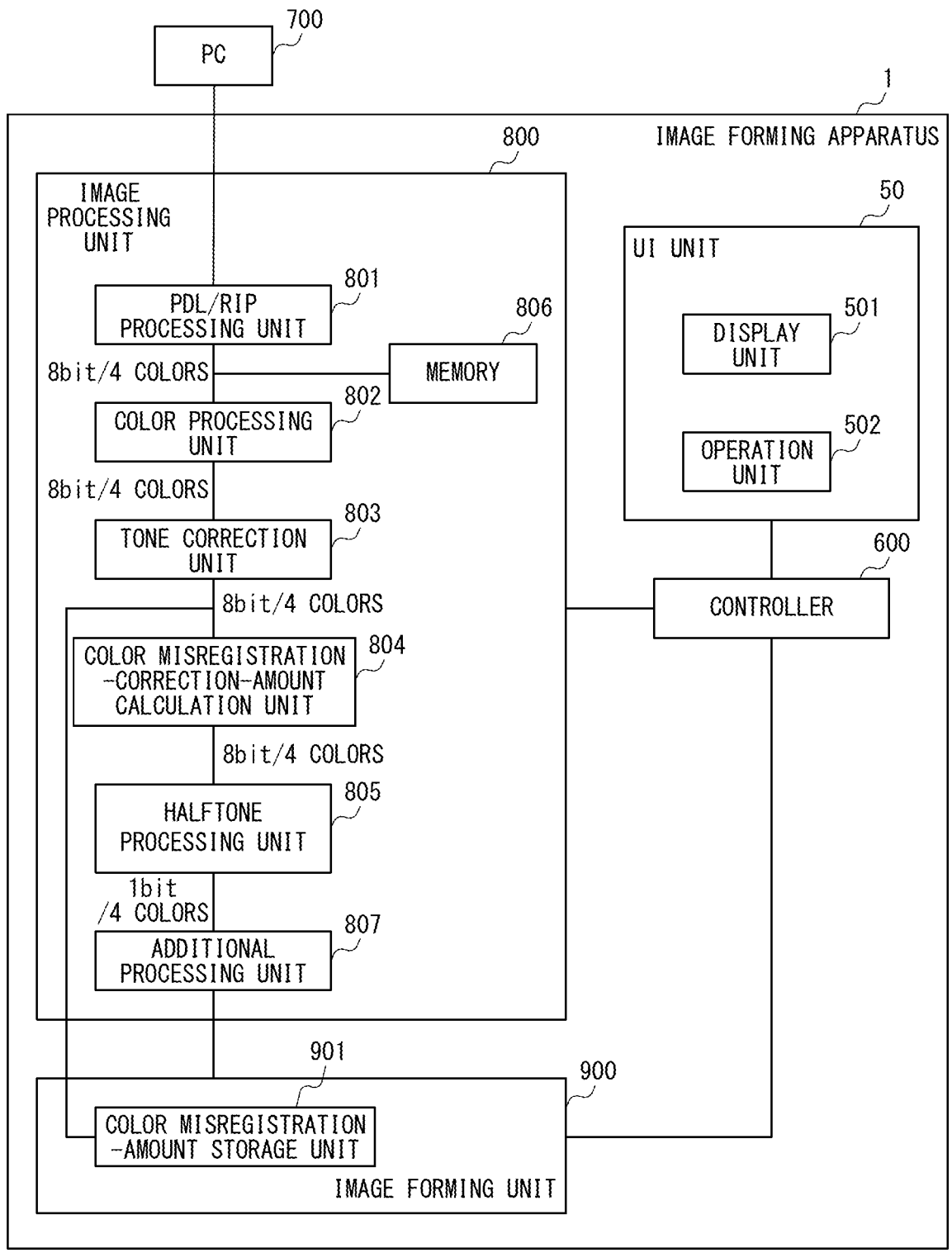
FIG. 10 is an explanatory diagram of a related-art image processing unit.

The controller 600 displays an indication that the durable period of the cartridge (here, cartridge A: see FIG. 9) has expired on the display unit 501 of the UI unit 50 to prompt a user to replace the cartridge. The user replaces the cartridge A of which the durable period has expired in accordance with the indication on the display unit 501. However, in a case where the processing steps of Step S607 and Step S608 are performed by using the amount of color misregistration calculated for the cartridge A of which the durable period has expired, color misregistration is not accurately corrected because the amount of color misregistration for the cartridge A is different from the amount of color misregistration for the cartridge B after replacement, and hence an image defect is formed. Thus, in a case where the controller 600 has detected cartridge replacement, the controller 600 instructs the image forming unit 900 to perform calibration for the cartridge after replacement. Subsequently, the controller 600 clears the second image data that is stored in the memory 806 and has not been output, in the processing step of Step S605.

In this embodiment, a difference between the actual main scanning line 302 and the ideal main scanning line 301 is stored for each color in the color misregistration-amount storage unit 901 as the amount of color misregistration, as described with reference to FIG. 2. That is, the amount of color misregistration is stored for each color in the color misregistration-amount storage unit 901 as information indicating the slope and curvature of a main scanning line in each region divided by points at which measurement has been performed. In the case in which it is determined in Step S602 that calibration has been performed, the second image data that has not been output is cleared from the memory 806, and the image processing in Step S607 is performed for the first image data of the corresponding data stored in the memory 806. The second image data is thus created again.

As described above, the first image data is also stored in the memory 806. Accordingly, an image for which tone correction, correction of color misregistration, or the like has been performed again can be formed even in the case in which component replacement changing the hue, the image density, the amount of color misregistration, or the like has been performed in the middle of a job. Thus, even in a case where a component such as a cartridge is replaced in the middle of a job, correction of hue change or correction of the amount of color misregistration can be performed at low cost, and hence hue change or change of the amount of color misregistration can be suppressed.

Further, the storage capacity of the memory 806 can be significantly reduced, as compared with the case of storing the first image data after being processed by the RIP processing and before being processed by the halftone processing. For example, in the case in which the resolution of the image forming apparatus 1 is 600 dpi, image data of an image of one sheet of A4 size for four colors including CMYK is about 139 MB (4 color×210 mm×297 mm×8 bits) before the halftone processing. Meanwhile, the first image data before the RIP processing is typically often less than 1 MB. The second image data after the halftone processing is about 17 MB (4 colors×210 mm×297 mm×1 bit), and hence it suffices that the storage capacity is about 18 MB in order to store such second image data and the first image data before the RIP processing together. As described above, the storage capacity of the memory 806 can be significantly suppressed.

Although the case of using halftone processing as a method of compressing image data has been described here, the compression method is not limited thereto. It suffices that compression of image data is performed by lossy compression processing that does not allow tone correction or correction of color misregistration to be performed again. Further, although the case of replacing a cartridge including the photosensitive drum 11, the charging roller 12, and the developing device 14 has been described here, this embodiment is effective in a case where a component that can change any of the hue, the image density, and the amount of color misregistration, for example, is replaced. The component that can change the hue, the image density, the amount of color misregistration, or the like is at least one of the photosensitive drum 11, the charging roller 12, the laser scanner unit 13, the developing device 14, the primary transfer roller 15, or the fixing unit 30. In addition, this embodiment is effective also in the case of performing calibration because of environmental change or change with time.

Figure 7:
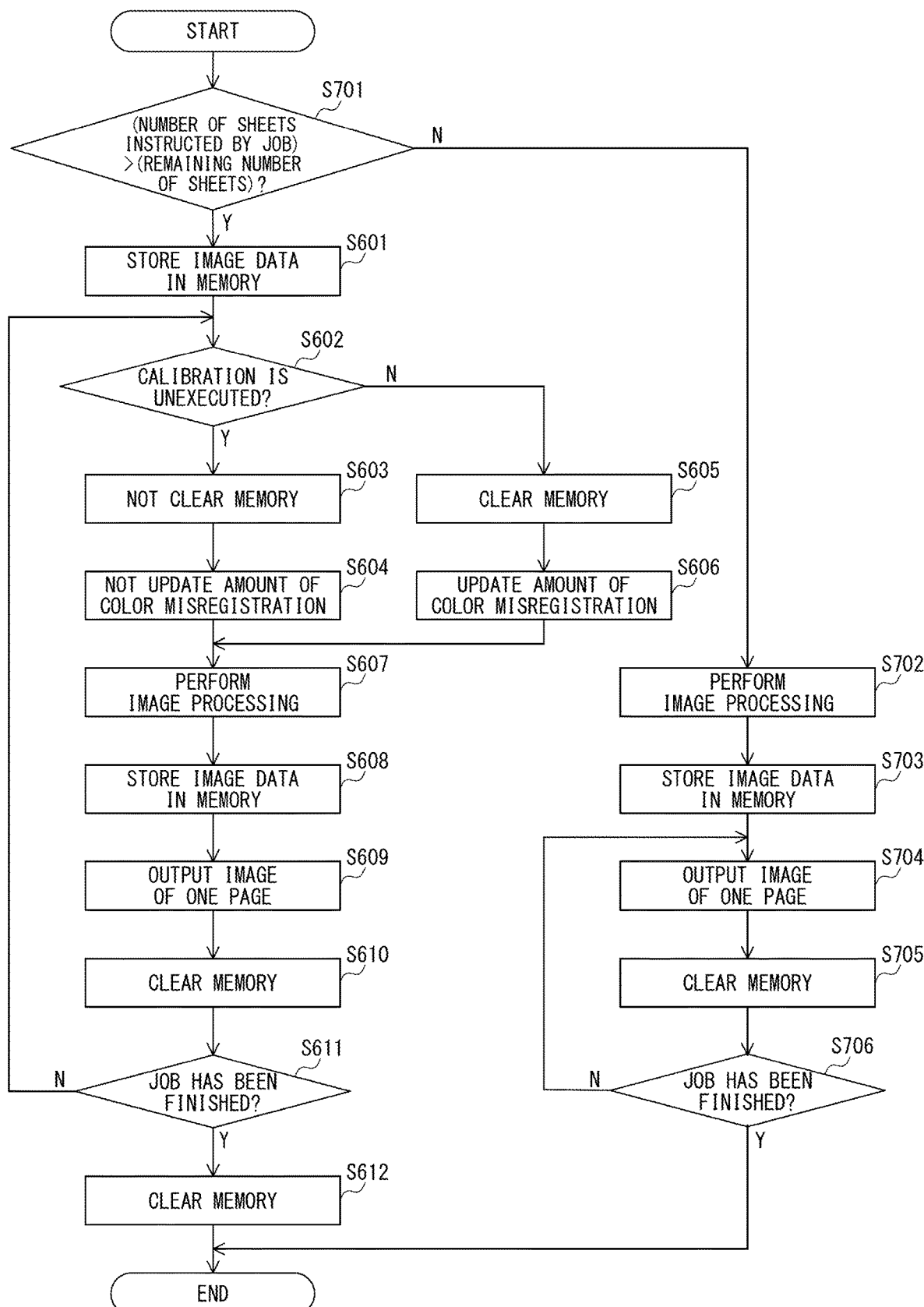
FIG. 7 is a flowchart for illustrating processing of correcting an amount of color misregistration.
Figure 8:
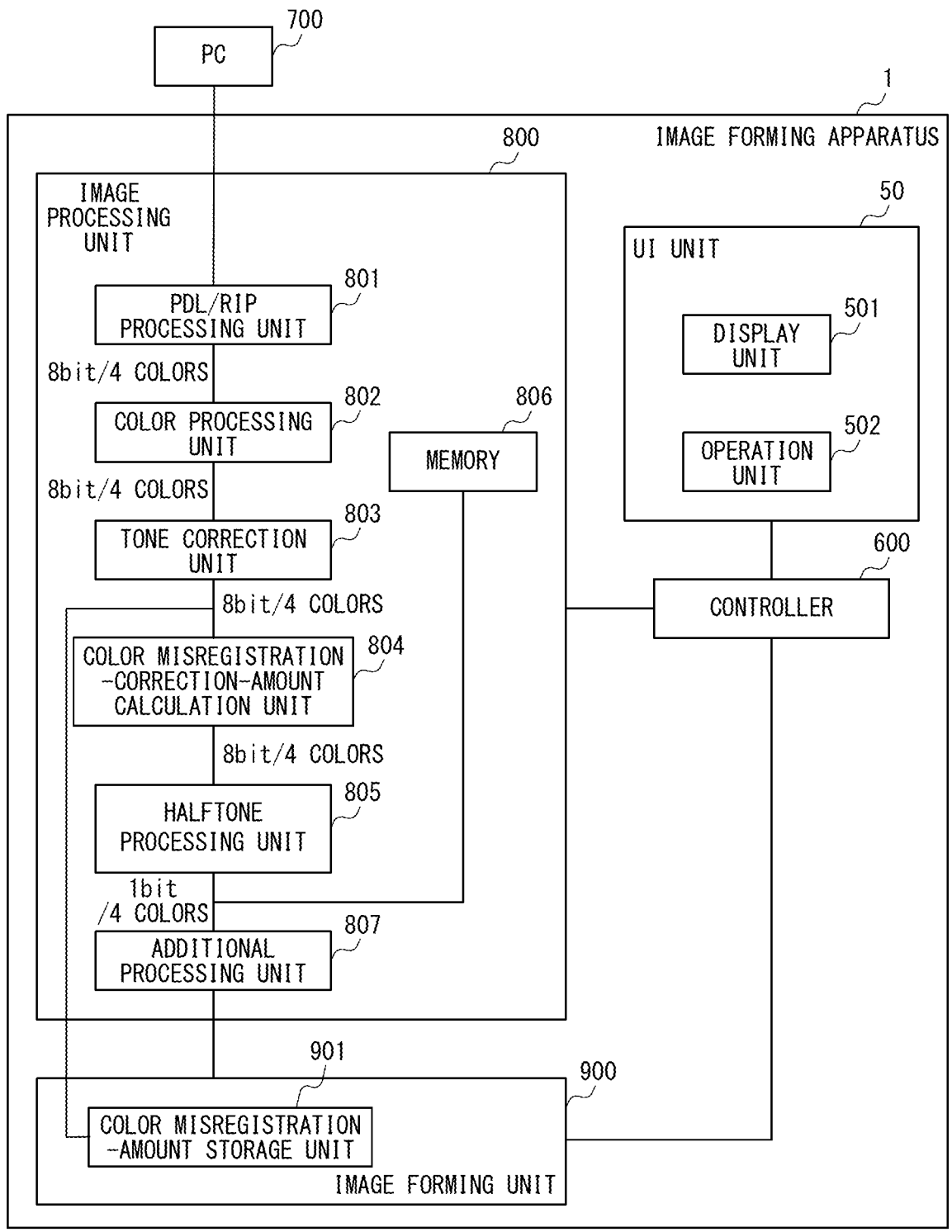
FIG. 8 is an explanatory diagram of a related-art image processing unit.

FIG. 7 is a flowchart for illustrating processing of correcting the amount of color misregistration. This processing is performed in order to suppress the influence of cartridge replacement on the productivity.

In a case where a job is acquired, the controller 600 compares the number of printable sheets in the remaining durable period of a cartridge (the remaining number of sheets) and the number of sheets to be printed that is instructed by the job with each other (Step S701). In a case where the number of sheets instructed by the job is more than the remaining number of sheets (Step S701: Y), the controller 600 performs the processing steps described with reference to FIG. 6 (Step S601 to Step S612).

In a case where the number of sheets instructed by the job is less than the remaining number of sheets (Step S701: N), the controller 600 does not cause the image processing unit 800 to store the first image data in the memory 806. The controller 600 performs the same image processing as that in Step S607 (Step S702) and stores the second image data in the memory 806 (Step S703). In this case, the image processing unit 800 stores the second image data in the memory 806 but does not store the first image data. After that, the controller 600 performs image printing processing by the same processing steps as those of Step S609 to Step S611 of FIG. 6 (Step S704, Step S705, and Step S706).

In the case of storing the first image data in the memory 806, when image data that requires time to be processed by RIP processing continues, the image processing speed becomes slower than the productivity of the image forming unit 900, thus reducing the productivity. However, in the case in which only the second image data is stored in the memory 806, the influence of delay of the RIP processing can be minimized.

As described above, in a case where the number of sheets to be printed that is instructed by the job and the remaining number of sheets are compared with each other, and the number of sheets to be printed is less than the remaining number of sheets, there is no possibility that cartridge replacement is performed during job execution. Thus, there is no risk of change of the amount of color misregistration by cartridge replacement during job execution. In such a case, the first image data is not stored in the memory 806, but only the second image data is stored. Thus, the second image data can be stored to the upper limit of the storage capacity of the memory 806. Accordingly, a time period in which the productivity of the image forming apparatus 1 can be reduced can be minimized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-166637, filed Oct. 11, 2021, which is hereby incorporated by reference herein in its entirety.

What is claimed is:

1. An image forming apparatus comprising:
an image forming unit configured to form an image on a sheet;
an image processing unit configured to perform processing, which comprises correction of color misregistration, on image data for controlling the image forming unit to form the image; and
a controller configured to instruct the image forming unit to perform calibration in a case where a component of the image forming unit is replaced,
wherein the image forming unit includes a storage unit, and is configured to acquire correction information to be used for the correction of color misregistration in the calibration to store the correction information in the storage unit,
wherein the image processing unit includes a memory configured to store first image data, which is the image data before being processed, and second image data, which is obtained by compressing the image data after being processed,
wherein, in a case where the calibration is unexecuted, the controller is configured to control the image forming unit to form an image based on the second image data stored in the memory, and
wherein, in a case where the calibration has been executed, the controller is configured to control the image forming unit to update the correction information stored in the storage unit, control the image processing unit to process the first image data based on the updated correction information, and control the image forming unit to perform image formation based on the processed first image data.

2. The image forming apparatus according to claim 1, wherein, in a case where the calibration has been executed, the controller is configured to clear the second image data stored in the memory, and control the image processing unit to process the first image data before being processed corresponding to the cleared second image data, based on the updated correction information.

3. The image forming apparatus according to claim 1, wherein the image processing unit is configured to generate the second image data by compressing the image data by lossy compression which inhibits the correction from being performed again.

4. The image forming apparatus according to claim 3, wherein the image processing unit is configured to generate the second image data by performing halftone processing on the image data.

5. The image forming apparatus according to claim 1,
wherein the image forming unit comprises a cartridge which is replaceable, and
wherein the controller is configured to instruct the image forming unit to perform the calibration in a case where the cartridge is replaced.

6. The image forming apparatus according to claim 5,
wherein the cartridge is at least one of a photosensitive drum, a charging device, an exposure device, or a developing device, and
wherein the controller is configured to instruct the image forming unit to perform the calibration in a case where at least one of the photosensitive drum, the charging device, the exposure device, or the developing device is replaced.

7. The image forming apparatus according to claim 5, wherein the controller is configured to compare a first number of sheets printable in a remaining durable period of the cartridge and a second number of sheets instructed by a job with each other and, in a case where the second number of sheets is less than the first number of sheets, inhibit the memory from storing the first image data.

8. The image forming apparatus according to claim 1, wherein the image forming unit is configured to form the image that is a full-color image by superimposing images of a plurality of colors and, in a case where the calibration is instructed, acquire a color misregistration amount of each color and store the correction information for correcting the color misregistration amount in the storage unit.

9. The image forming apparatus according to claim 8, wherein the image processing unit is configured to perform the correction of color misregistration on the image data based on the correction information for correcting the color misregistration amount.

\* \* \* \* \*